Figure 1:
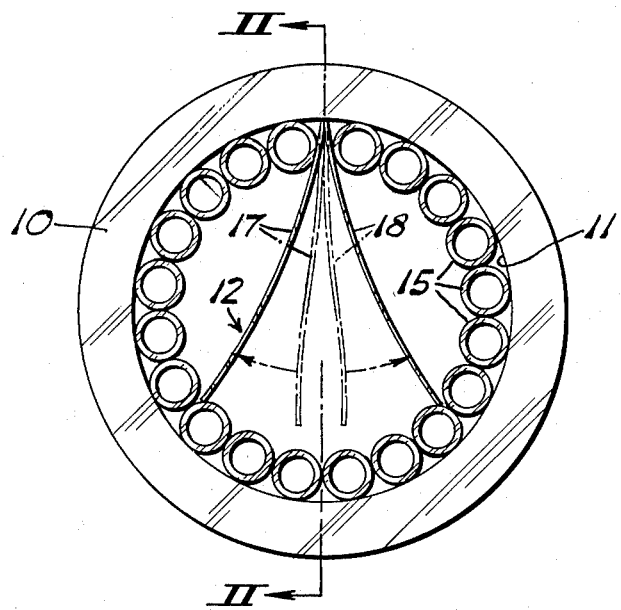

Oct. 11, 1955     H. J. VANSTROM     2,720,066
WORK HOLDING FIXTURE
Filed Oct. 6, 1954

INVENTOR.
HAROLD J. VANSTROM
BY
Beau, Brooks, Buckley & Beau,
ATTORNEYS.

United States Patent Office 2,720,066
Patented Oct. 11, 1955

2,720,066

WORK HOLDING FIXTURE

Harold J. Vanstrom, Bemus Point, N. Y.

Application October 6, 1954, Serial No. 460,656

7 Claims. (Cl. 51—217)

This invention relates to work holding devices and more particularly to a novel fixture for holding a plurality of cylindrical objects in accurate relative locations for performing simultaneous abrading or other machining operations thereon or for analogous purposes.

In grinding the radial or end faces of relatively small cylindrical workpieces, particularly in mass production or when a multiplicity of pieces must be similarly ground or otherwise machined, a considerable problem is encountered in properly positioning the workpieces for such grinding or similar machining. The roller elements of roller bearings are a typical case in point, although the work holding fixture of the present invention may be employed for any similar purposes wherever cylindrical or partly cylindrical workpieces are to be held with their end or radial faces or one of their end or radial faces accessible for grinding, other machining, or any similar fabricating or treating operation. For instance, the present application shows by way of example workpieces which comprise hollow cylindrical members in the form of short sleeves or collars.

In the instance set forth herein by way of example the cylindrical workpieces, prior to the end face grinding or other treatment contemplated in the method of the present invention and involving the employment of the fixture of the present invention, have their peripheries accurately ground or otherwise machined or finished to precision dimensions. However, it is not necessary to successful operation of the fixture of the present invention that the diameters of the workpieces be entirely precise and equal in their diameters or in finally finished form, although the results obtained will depend in general upon the trueness of the peripheries of the workpieces since, in any event, the end faces of the workpieces held in the fixture of the present invention will be presented for grinding or other machining or treating in such manner that they are accurately disposed at right angles to their peripheries.

While the work holding fixture of the present invention is applicable wherever the advantages inherent in the device make its use advisable or expedient, reference will be had in the following specification to its use in holding a plurality of cylindrical workpieces in proper alignment on the magnetic chuck work-receiving table of a conventional surface grinder, to present the workpieces in such position that the radial end faces of a considerable number of the workpieces may be simultaneously ground.

While a single complete specific embodiment of the principles of the present invention, both as to construction of the fixture itself and as to its mode of environment of use, is set forth in detail in the following specification and is illustrated in the accompanying drawing, it is to be understood that the invention is not limited to the details shown and that certain variations in the construction of the fixture and its mode of use may be made without departing from the spirit of the invention, the scope of which is limited only as defined in the appended claims.

Figure 2:
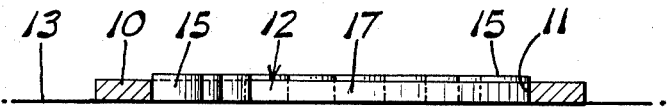

In the drawing:

Fig. 1 is a top plan view of one form of the fixture of the present invention holding a number of cylindrical workpieces in tangentially abutting positions with their axes extending vertically and parallel to each other; and Fig 2 is a cross-sectional view on the line II—II of Fig. 1.

Referring particularly to Fig. 1, the fixture of the present invention in the form illustrated herein by way of example comprises essentially an annular member 10 having a circular central opening 11, the walls of which are preferably precision ground to be precisely at right angles to the axis of the annulus, and locking means designated generally by the numeral 12, the construction and operation of which will be more specifically described later herein.

In use the annular member 10 is placed upon a surface plate or similar work surface or directly on the magnetic chuck of a surface grinder such as is indicated by the numeral 13 in Fig. 2. A group of cylindrical workpieces, in the present instance in the form of hollow cylindrical collars, the workpieces being designated 15 in the drawing, are placed endwise on the table 13 and arranged generally in tangential abutment with the periphery of the opening 11 of annular member 10, approximately as shown in Fig. 1 of the drawing.

The circumference of the opening 11 of the annular member 10 may be of any desired or convenient extent depending on the number of workpieces to be accommodated. When a circular series of workpieces is disposed as shown in Fig. 1 in tangential abutment with the peripheral surface of the opening 11 of annular member 10 and as many workpieces as possible are so arranged, the proportions should be such that the workpieces will not exactly fully occupy such inner periphery but will leave a gap as indicated at the upper side of the circular series of workpieces in Fig. 1.

Such a gap is essential to operation of the present invention although its width may vary within moderate limits. The locking means which is generally designated by the numeral 12 comprises, in the present instance, a pair of elongated generally rectangular spring leaf members 17 and 18. The spring leaf members 17 and 18 may be of various forms and may, in their unstressed state, be merely flat plates. However, to facilitate manipulation, the leaf members 17 and 18 of the present illustrative example are of the form shown in dot and dash lines in Fig. 1 when unstressed. In the present instance the leaf members are entirely separate and disjoined although they might be connected at their upper ends as viewed in Fig. 1 in any desired manner.

To lock the series of workpieces 15 it is merely necessary to place the leaf members in the position shown in dot and dash lines in Fig. 1 and then hook the lower ends of the leaf members, as there viewed, into the full line locking position by a combined spreading and raising and lowering movement of the lower ends of the leaf members.

The engagement of the lower ends of the leaf members between spaced pairs of workpieces as shown in full lines in Fig. 1 does not in and of itself lock the workpieces but serves to retain the leaf members releasably in a spread condition and this spreading at the upper abutting ends of the leaf members exerts a spreading force against the two adjacent workpieces at the top of the series in Fig. 1. This spreading force is generally along the line of the pitch circle of the series of workpieces and this locks the entire series of workpieces 15 securely against the peripheral wall of opening 11 of annular member 10.

The wedging or spreading action of the leaf members 17 and 18 against the two workpieces which lie at opposite sides of their upper abutting portions exerts substantial force components against these two adjacent workpieces 15 in a circular direction, that is, in a direction lying along a pitch circle drawn through the centers of the various workpieces 15.

When the locking means 12 is thus locked in position the entire assembly comprising annular member 10, the workpieces 15, and the leaf members 17 and 18 may be picked up and handled as a rigid unit if desired, although the foregoing assembly may be effected directly on the magnetic chuck work receiving table of a machine tool such as a surface grinder. If the assembly is performed on the usual magnetic chuck, it is merely necessary at this point to energize the magnetic chuck and proceed with the grinding of one end face of each of the workpieces simultaneously.

Following the grinding operation or other treatment of the upper ends of the workpieces as viewed in Fig. 2, the workpieces may all be reversed end-for-end to grind their opposite end or radial surfaces. To do this it is not necessary to disassemble the entire group of workpieces, but the entire fixture with the locked workpieces may merely be turned upside down on the work surface, such as the surface of a magnetic chuck 13, and the locking means 12 may be momentarily released by a lifting of the lower ends of the leaf members 17 and 18 which permits them to return toward the dot-and-dash line position of Fig. 1.

Since the annular member 10 and the leaf members 17 and 18 are preferably of substantially less thickness or vertical dimension than the axial lengths of the workpieces, this temporary unlocking permits the annular member 10 and leaf members 17 and 18 to drop to the surface of the work table, magnetic chuck table, surface plate, or the like, leaving the ends of the workpieces which are now uppermost disposed substantially above the top surfaces of annular member 10 and leaf members 17 and 18. The workpieces are then relocked by manipulation of the lower ends of leaf members 17 and 18 as described above and the second end or radial face of each of the workpieces may be ground or otherwise worked upon as desired.

If desired the circumference of the inner periphery of opening 11 and the thickness of the leaf members 17 and 18 may be so proportioned that the leaf members may serve as thickness or feeler gage members between the adjacent workpieces to thus measure the cumulative accuracy of the diameters of the series of workpieces.

What is claimed is:

1. A fixture for holding a plurality of cylindrical workpieces comprising a member having a circular opening for receiving a generally circular series of such workpieces disposed tangentially against the periphery of said opening with their axes parallel to the axis of the opening, and locking means comprising a pair of resilient substantially flat elongated plate members having corresponding end portions disposed between a pair of workpieces of said series with their opposite ends resiliently spread from each other and projecting radially outwardly to engage against the inner sides of spaced workpieces lying generally opposite to said first pair of workpieces to maintain the plate members in resiliently spread position.

2. A fixture for holding a plurality of cylindrical workpieces comprising a member having a circular opening for receiving a generally circular series of such workpieces disposed tangentially against the periphery of said opening with their axes parallel to the axis of the opening, and locking means comprising a pair of resilient substantially flat elongated plate members having corresponding end portions disposed between a pair of workpieces of said series with their opposite ends resiliently spread from each other and projecting against the inner sides of spaced workpieces to maintain the plate members in resiliently spread position.

3. A fixture for holding a plurality of cylindrical workpieces comprising a member having a circular opening for receiving a generally circular series of such workpieces disposed tangentially against the periphery of said opening with their axes parallel to the axis of the opening, and locking means comprising a pair of elongated spring members having corresponding relatively flat end portions disposed in abutment and between a pair of workpieces of said series with the opposite ends of said spring members resiliently spread from each other and projecting radially outwardly to engage the inner sides of the peripheries of spaced workpieces to maintain the spring member in resiliently spread position.

4. A fixture for holding a plurality of cylindrical workpieces comprising a member having a circular opening for receiving a generally circular series of such workpieces disposed tangentially against the periphery of said opening with their axes parallel to the axis of the opening, and locking means comprising a pair of elongated spring members having corresponding relatively flat end portions disposed in abutment and between a pair of workpieces of said series with the opposite ends of said spring members resiliently spread from each other and projecting against the inner sides of spaced workpieces to maintain the spring member in resiliently spread position.

5. A fixture for holding a plurality of cylindrical workpieces with their end faces in substantially common planes comprising an annular member for receiving a generally circular series of such workpieces disposed tangentially against the inner periphery of said annular member with their axes parallel to the axis of the annular member, and locking means comprising a pair of resilient substantially flat elongated plate members having corresponding end portions disposed between a pair of workpieces of said series with their opposite ends resiliently spread from each other and projecting against the inner sides of spaced workpieces to maintain the plate members in resiliently spread position.

6. A fixture for holding a plurality of cylindrical workpieces with their end faces in substantially common planes comprising an annular member for receiving a generally circular series of such workpieces disposed tangentially against the inner periphery of said annular member with their axes parallel to the axis of the annular member, and locking means comprising a pair of elongated spring members having corresponding relatively flat end portions disposed in abutment and between a pair of workpieces of said series with the opposite ends of said spring members resiliently spread from each other and projecting radially outwardly to engage against the inner sides of spaced workpieces to maintain the spring members in resiliently spread position.

7. A fixture for holding a plurality of cylindrical workpieces with their end faces in substantially common planes comprising an annular member for receiving a generally circular series of such workpieces disposed tangentially against the inner periphery of said annular member with their axes parallel to the axis of the annular member, and locking means comprising a pair of elongated spring members having corresponding relatively flat end portions disposed in abutment and between a pair of workpieces of said series with the opposite ends of said spring members resiliently spread from each other and projecting against the inner sides of spaced workpieces to maintain the spring members in resiliently spread position.

References Cited in the file of this patent

UNITED STATES PATENTS

| | | |
|---|---|---|
| 479,406 | Dickerson et al. | July 26, 1892 |
| 1,763,647 | Danner | June 17, 1930 |
| 2,695,481 | Vanstrom | Nov. 30, 1954 |